United States Patent
Özdemir et al.

(10) Patent No.: US 8,194,978 B2
(45) Date of Patent: Jun. 5, 2012

(54) METHOD OF AND APPARATUS FOR DETECTING AND ADJUSTING COLOUR VALUES OF SKIN TONE PIXELS

(75) Inventors: Hüseyin Özdemir, Istanbul (TR); Yucel Altunbasak, Alpharetta, GA (US)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 820 days.

(21) Appl. No.: 12/328,085

(22) Filed: Dec. 4, 2008

(65) Prior Publication Data

US 2009/0169099 A1 Jul. 2, 2009

Related U.S. Application Data

(60) Provisional application No. 60/992,529, filed on Dec. 5, 2007.

(51) Int. Cl.
G06K 9/00 (2006.01)
G06K 9/34 (2006.01)

(52) U.S. Cl. ........................................... 382/167

(58) Field of Classification Search .................. 382/162, 382/164, 165, 167, 260, 274, 283; 358/2.1, 358/515, 518; 348/180, 207.99, 222.1, 223.1, 348/234, 553, 554, 645, 649, E09.053
See application file for complete search history.

(56) References Cited

U.S. PATENT DOCUMENTS

| | | | |
|---|---|---|---|
| 5,130,935 A | 7/1992 | Takiguchi | |
| 5,384,601 A | 1/1995 | Yamashita et al. | |
| 7,113,203 B1 * | 9/2006 | Wu et al. | 348/207.99 |
| 7,599,093 B2 * | 10/2009 | Kagaya | 358/2.1 |
| 7,782,398 B2 * | 8/2010 | Chan et al. | 348/553 |
| 7,860,339 B2 * | 12/2010 | Yamashita et al. | 382/274 |
| 7,936,919 B2 * | 5/2011 | Kameyama | 382/167 |
| 2003/0043394 A1 | 3/2003 | Kuwata | |
| 2004/0114798 A1 | 6/2004 | Park | |
| 2005/0175236 A1 * | 8/2005 | Piepers | 382/162 |
| 2006/0066912 A1 | 3/2006 | Kagaya | |
| 2006/0188152 A1 | 8/2006 | Wang et al. | |
| 2006/0238655 A1 * | 10/2006 | Chou | 348/645 |
| 2007/0085911 A1 * | 4/2007 | Nakamura | 348/223.1 |
| 2009/0169099 A1 * | 7/2009 | Ozdemir et al. | 382/164 |
| 2010/0172578 A1 * | 7/2010 | Reid et al. | 382/165 |

FOREIGN PATENT DOCUMENTS

EP 1139653 10/2001

OTHER PUBLICATIONS

European Search Report and Written Opinion for EP 08 101244 dated May 23, 2008 (8 pages).

* cited by examiner

*Primary Examiner* — Amir Alavi
(74) *Attorney, Agent, or Firm* — Conley Rose, P.C.

(57) ABSTRACT

A method of detecting skin tone pixels in an input image and adjusting color values thereof for an output image is disclosed. The method comprises determining for each of a plurality of pixels in an input image whether initial chromaticity values of each of said pixels lie within a skin tone area defined in a chromaticity plane. The method further comprises amending the initial chromaticity values of those pixels that have chromaticity values lying within said skin tone area to obtain amended chromaticity values for use in obtaining an output image.

24 Claims, 6 Drawing Sheets

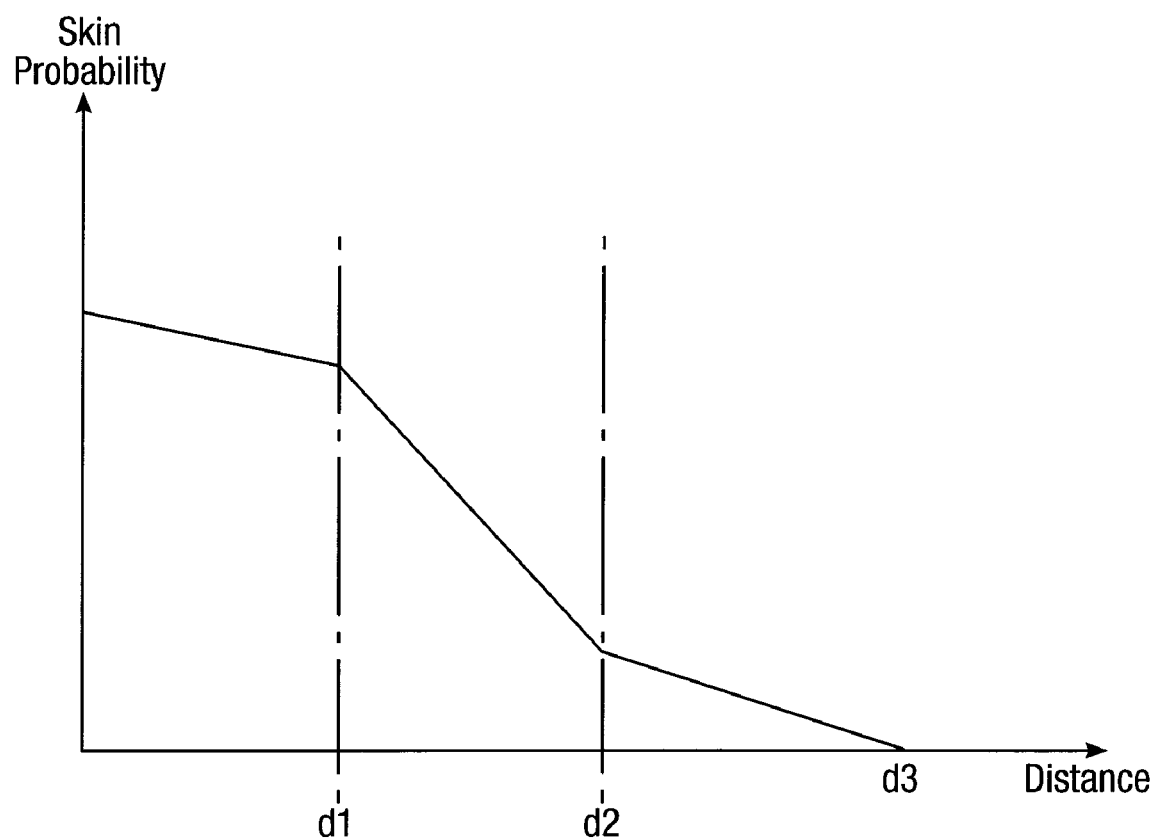

METHOD OF AND APPARATUS FOR DETECTING AND ADJUSTING COLOUR VALUES OF SKIN TONE PIXELS

CROSS-REFERENCE TO RELATED APPLICATIONS

This application claims the benefit of priority to U.S. application Ser. No. 60/992,529, filed Dec. 5, 2007, the content of which is hereby incorporated by reference in its entirety for all purposes.

FIELD OF INVENTION

The invention relates to a method of and apparatus for detecting and adjusting colour values of skin tone pixels.

BACKGROUND

It is well known that the human visual system is particularly sensitive to skin colour. This means that the human eye readily detects even slight variations or abnormalities in the reproduction of skin colour in images, such as digital images reproduced by printing, on a display screen (including a television screen, computer monitors or screens), etc., etc. A number of techniques for improving the reproduction of skin colour in an image are known.

For example, an apparatus and method for reproducing skin colour in a video signal is disclosed in US-A-2004/0114798. The apparatus of this prior art is shown schematically in the block diagram of FIG. 1. The apparatus comprises an input pixel value discriminating unit 30 which includes a distance value calculating part 34 and a distance value discriminating part 35. A standardization pixel value obtaining unit 31 includes a change quantity calculating part 36 and a standardization colour difference signal calculating part 37.

In this prior art method, initially, a determination is made as to whether or not a pixel is a skin tone pixel on the basis of the luminance of the pixel; this is on the assumption that skin tone pixels tend to have a luminance value between certain minimum and maximum luminance values, which are determined experimentally. If the luminance value of a pixel is between these two limits, then it is determined that the pixel can be a skin colour pixel and the next step is a colour check for the pixel. If the luminance value of a pixel is not between these two limits, then it is determined that the pixel is not a skin colour pixel and the next pixel is processed. Then, for a pixel passing the luminance check, the next step is a colour check. In this prior art method, which uses the YCbCr model in which the luminance component Y is separate from the chrominance components Cb,Cr, the skin colour locus is a rotated ellipse located on the CbCr plane. In fact, in this prior art, the skin colour locus defines a small ellipse within a larger ellipse. The inner ellipse is called the "typical skin colour area" and the remaining area (within the outer ellipse but outside the inner ellipse) is called the "atypical [i.e. "untypical"] skin colour area". A distance metric "dp" between the pixel location (using its Cb,Cr coordinates on the CbCr plane) and the centre point of the skin colour locus is calculated in the unit 34. A Mahalanobis distance metric is used for this distance calculation.

In the distance value discriminating unit 35 of this prior art, "dp" is used to discriminate whether the pixel is a skin colour pixel or not. Three thresholds are used for this. If "dp" is less than the first threshold (i.e. if the pixel resides on the "typical skin colour area"), then it is determined that the pixel is a skin colour pixel and that there is no need for colour correction. If "dp" is between the second and third thresholds (i.e. if the pixel resides on the "atypical skin colour area"), then it is determined that the pixel is a skin colour pixel and that its colour should be corrected. If "dp" is greater than the third threshold (i.e. if pixel is outside the skin colour locus), then it is determined that the pixel is not a skin colour pixel.

For a pixel that is determined to be a skin colour pixel and that its colour should be corrected, the next step in this prior art is colour correction in which the Cb and Cr chrominance components of the pixel are effectively moved towards the centre of the skin colour locus. The luminance component of the pixel may then be corrected separately and independently.

For a number of reasons, this prior art method is computationally complex and is also relatively inefficient at identifying which pixels are skin tone pixels and which need to have their colour values adjusted, and also in the way in which the colour values are adjusted.

According to a first aspect of the invention, there is provided a method of detecting skin tone pixels in an input image and adjusting colour values thereof for an output image, the method comprising:

determining for each of a plurality of pixels in an input image whether initial chromaticity values of each of said pixels lie within a skin tone area defined in a chromaticity plane; and, amending the initial chromaticity values of those pixels that have chromaticity values lying within said skin tone area to obtain amended chromaticity values for use in obtaining an output image.

The term "chromaticity values" will be understood to refer to values in a two-dimensional colour model that includes both chrominance and luminance information. A current example of such a colour model is the rg chromaticity plane (or "rg chromaticity space" or "rg chromaticity model").

In contrast in particular with the method of US-A-2004/0114798, the preferred embodiment of the invention carries out a skin colour discrimination for the pixels effectively by evaluating both luminance and colour information, which leads to a better and more accurate discrimination of which pixels are skin tone pixels and which are not. Moreover, this is done in a computationally efficient way by using a chromaticity plane, which is two-dimensional yet has both luminance and colour information so the luminance and colour information are effectively evaluated together. Also, for adjusting the skin tone pixels, because this is done using the chromaticity plane, again the luminance and colour of the pixels concerned are effectively adjusted together in a computationally efficient way.

In an embodiment, the colours of the pixels in the input image are initially provided as values according to the RGB colour model, and the method comprises: prior to the determining step, converting the RGB colour values of the pixels to corresponding initial chromaticity values which are used in the determining and amending steps; and, after the amending step, converting the amended chromaticity values to corresponding values according to the RGB colour model for use in obtaining the output image. The RGB colour model is used in many applications. It will however be understood that the colours of the pixels in the input image may be initially provided as values according to a different colour model and therefore a different conversion to chromaticity values may be required.

In an embodiment, the chromaticity values of those pixels that have chromaticity values lying outside said skin tone area are not amended. In this embodiment, the colour of only the skin tone pixels is adjusted, which, in at least some circumstances, can lead to an output image in which the skin colour is perceived to be more realistic or natural.

In an embodiment, for each of those pixels that have initial chromaticity values lying within said skin tone area, the chromaticity values are amended by an amount that depends on a distance of said initial chromaticity values for said pixel from a point within the skin tone area. Thus, those pixels that are furthest from say a centre of the skin tone area may have their chromaticity values adjusted by a larger amount than those pixels that are closest to a centre of the skin tone area, which can lead to an output image in which the skin colour is perceived to be more realistic or natural.

In an embodiment, for each of said pixels, said distance is a distance from the initial chromaticity values of said pixel to the medial axis of the skin tone area.

In an embodiment, the skin tone area is divided into plural regions and a first distance metric is used for pixels in a first of said regions and a second, different distance metric is used for pixels in a second of said regions. This allows this aspect of the method to be tailored according to the chromaticity values of the pixels, with different calculations being carried out for pixels according to where in the skin tone area those pixels are located. This again can lead to an output image in which the skin colour is perceived to be more realistic or natural.

In an embodiment, the first of said regions is in a central region of the skin tone area and the first distance metric is the distance from the initial chromaticity values of said pixel to the medial axis of the skin tone area in a direction parallel to an axis of the chromaticity plane. In an embodiment, the second of said regions is at or towards an end of the skin tone area and the second distance metric is the Manhattan distance from the initial chromaticity values of said pixel to the endpoint of the medial axis of the skin tone area that is closest to the initial chromaticity values of said pixel. These different distance metrics allow the computational complexity of the method to be kept down without unduly sacrificing the quality of the output image. Moreover, the Manhattan distance in particular is far more straightforward to calculate than the Mahalanobis distance mentioned above, which makes the present method more viable in domestic equipment, such as a television receiver.

In an embodiment, the skin tone area is divided into plural regions, and amending the initial chromaticity values of those pixels that have chromaticity values lying within said skin tone area to obtain amended chromaticity values for use in obtaining an output image comprises: amending the initial chromaticity values of those pixels that have chromaticity values lying within a first of said regions of said skin tone area to obtain amended chromaticity values in accordance with a first function; and, amending the initial chromaticity values of those pixels that have chromaticity values lying within a second of said regions of said skin tone area to obtain amended chromaticity values in accordance with a second function, which is different from the first function. This allows this aspect of the method to be tailored according to the chromaticity values of the pixels, with different functions for amending the values of the pixels being used for pixels according to where in the skin tone area those pixels are located. This again can lead to an output image in which the skin colour is perceived to be more realistic or natural.

In an embodiment, the first of said regions is in a central region of the skin tone area and said first function moves the chromaticity values of those pixels that are in the first of said regions towards an endpoint of the medial axis of the skin tone area.

In an embodiment, the second of said regions is at or towards an end of the skin tone area and said second function moves the chromaticity values of those pixels that are in the second of said regions in a direction parallel to an axis of the chromaticity plane.

These different functions allow the computational complexity of the method to be kept down without unduly sacrificing the quality of the output image.

According to a second aspect of the invention, there is provided apparatus for detecting skin tone pixels in an input image and adjusting colour values thereof for an output image, the apparatus comprising:

a pixel classifier for determining for each of a plurality of pixels in an input image whether initial chromaticity values of each of said pixels lie within a skin tone area defined in a chromaticity plane; and, a colour value adjuster for amending the initial chromaticity values of those pixels that have chromaticity values lying within said skin tone area to obtain amended chromaticity values for use in obtaining an output image.

The preferred apparatus and/or method may be incorporated into any apparatus and/or method that is used to enhance the colour of skin tone pixels of a digital image, including for example an image processor used in a television set or the like, printers, digital cameras, television broadcast capture cards, digital image processing software which may be used in many applications, etc., etc., and can be carried out in real time. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the invention will now be described by way of example with reference to the accompanying drawings, in which.

Figure 1:
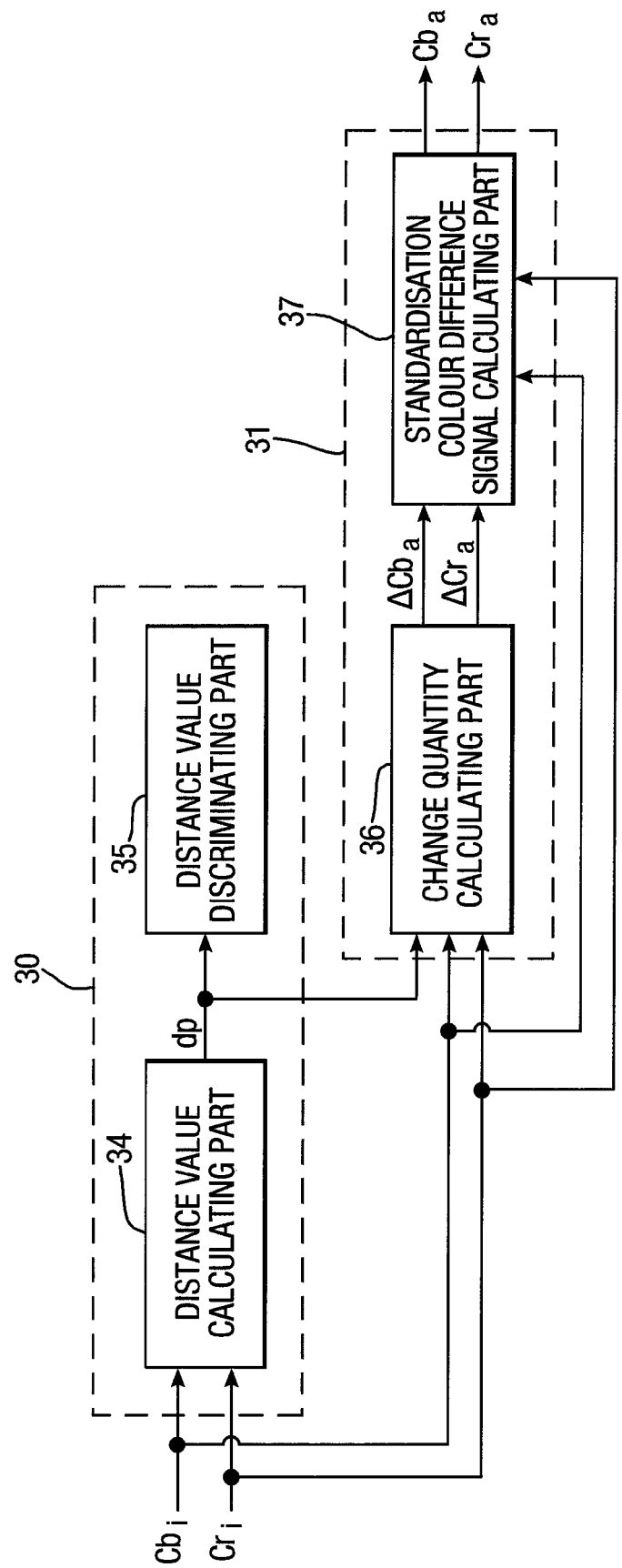
FIG. 1 shows a block diagram of a prior art method.
Figure 2:
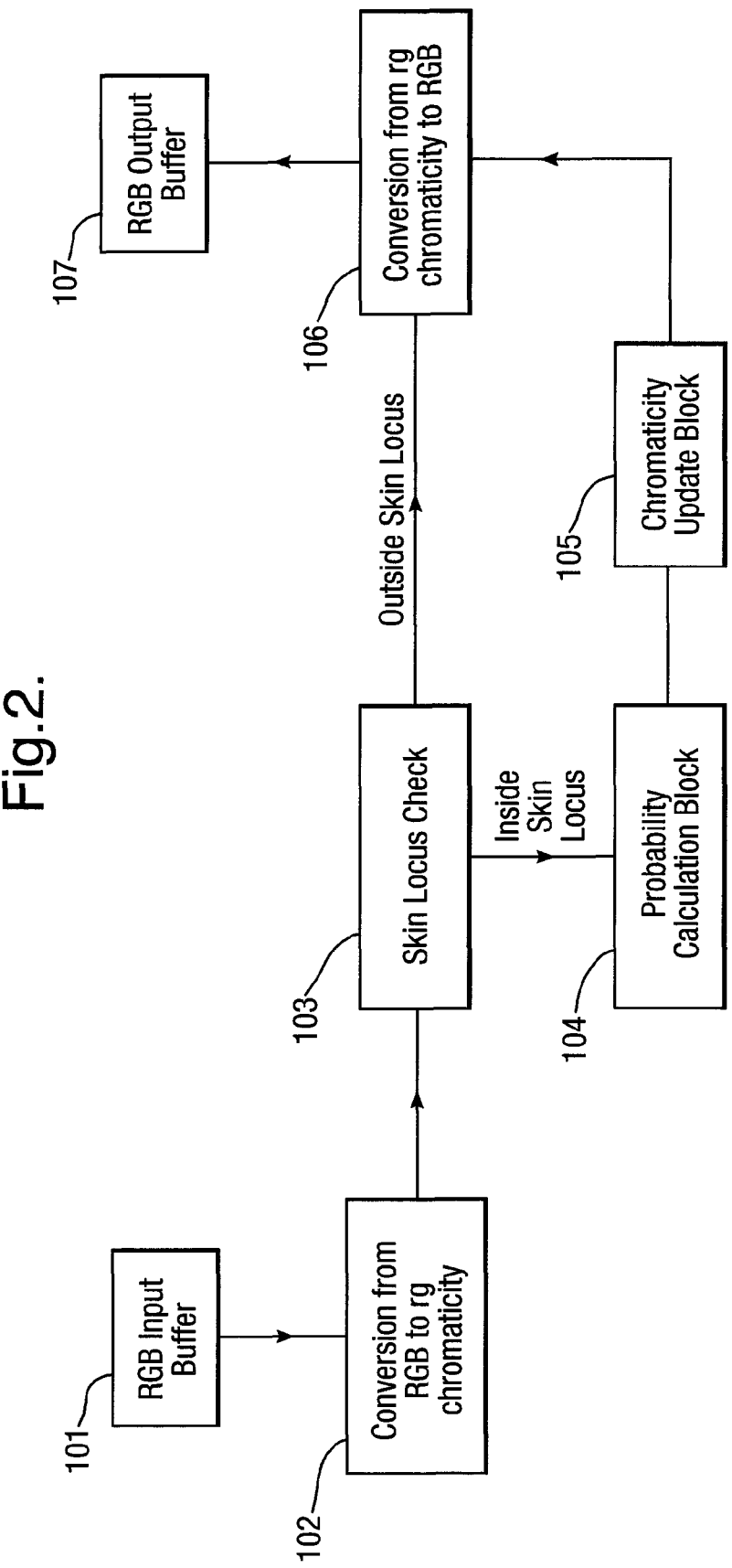
FIG. 2 shows a general block diagram of an example of an embodiment of the invention.

Referring first to FIG. 2, in overview, an example of a method according to an embodiment of the invention operates as follows. In step or block 101 an input data stream relating to the pixels in an input image is loaded into a storage buffer. In the present context, that data contains brightness and colour information. The data may be for example RGB data for each pixel in the input image.

In step or block 102, unless the data already is chromaticity data, the data stored in the buffer is converted to corresponding rg chromaticity data. As is known per se, the rg chromaticity space is a two-dimensional colour space or plane and the rg chromaticity components for each pixel include both luminance and chrominance information for the pixel. In principle, other two-dimensional colour spaces or planes having both luminance and chrominance information may be used.

In step or block 103, the pixels are classified as skin colour pixels or non-skin colour pixels in a detection phase. This classification is based on a skin tone locus on the rg chromaticity plane.

In step or block 104, after classification, a skin probability is calculated for every skin colour pixel.

In step or block 105, a chromaticity update is carried out on (at least some of) the skin colour pixels by moving the skin colour pixels (or at least those whose skin probabilities are greater than a predetermined threshold) towards the neighborhood of a preference locus in the rg chromaticity plane. In the preferred embodiment, the amount of movement is related to the skin probability of the pixel.

In step or block 106, the modified rg chromaticity values of the skin colour pixels are converted to corresponding RGB coordinates. Also, the rg chromaticity values for the non-skin colour pixels are received directly from the skin locus checking step or block 103 and converted to corresponding RGB coordinates. Alternatively, the original RGB coordinates for the non-skin pixels may have been stored previously and those original values recovered at this point.

In step or block 107, the modified RGB values for the skin colour pixels and the RGB values for the non-skin colour pixels are fed to an output buffer. From there, the image can be produced, whether by display on a television screen or other monitor, printed, etc.

Figure 3:
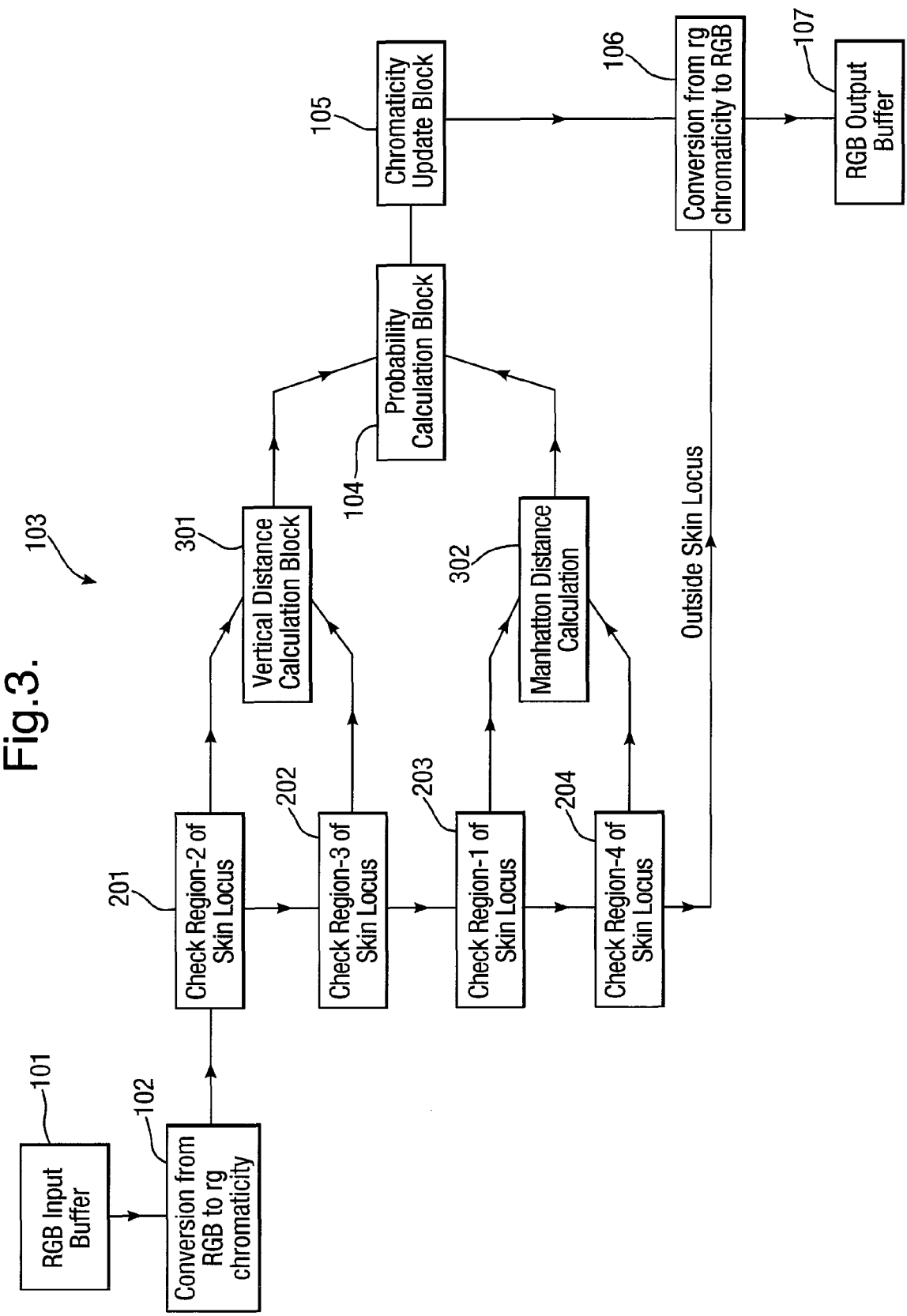
FIG. 3 shows a detailed block diagram of the example of FIG. 2.

FIG. 3 shows a detailed block diagram of an example of a method according to an embodiment of the invention. The same reference numerals as used in FIG. 2 are used for the same features in FIG. 3. It should be understood that the terms rg chromaticity and rg coordinates are used interchangeably.

In step or block 101, as above, an input data stream relating to the pixels in an input image is loaded into a storage buffer. In the present context, that data contains brightness and colour information. The data may be for example RGB data for each pixel in the input image.

In step or block 102, unless the data already is chromaticity data, the RGB data stored in the buffer is converted to rg chromaticity values as shown below:

$$r = \frac{R}{R+G+B}$$
$$g = \frac{G}{R+G+B}$$

Next, corresponding to step or block 103 of FIG. 2, each pixel is identified as a skin colour pixel or a non-skin colour pixel. This is accomplished by looking at the coordinates of the pixel on the rg chromaticity plane. If the pixel is inside a predefined skin locus, then it is accepted as a skin colour pixel. If, on the contrary, the pixel is outside the skin locus, then it is accepted as a non-skin colour pixel.

Figure 4:
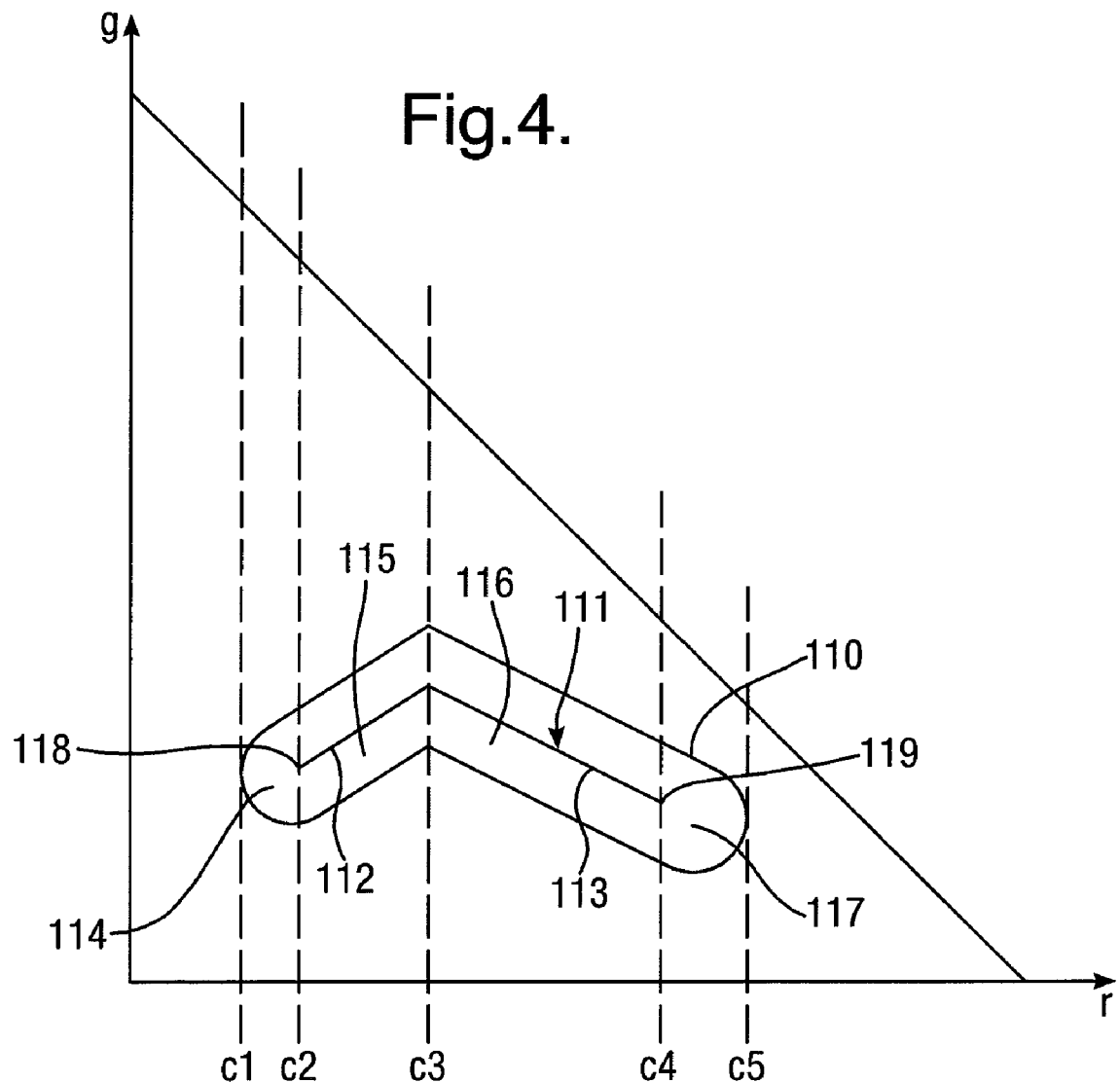
FIG. 4 shows an example of a skin colour locus on an rg chromaticity plane which may be used in the example of FIG. 2.

The skin locus is a set of points on the rg chromaticity plane. An example of a skin locus 110 is shown in FIG. 4. A number of ways of determining an appropriate skin locus 110 are available. In one example, the skin locus 110 is found by trial and error. It will be understood that the shape of the skin locus 110 on the rg chromaticity plane may be different from that shown in FIG. 4. The medial axis 111 of the locus 110 is approximated as the union of two lines 112,113. The locus 110 is divided into four regions 114-117: the first region 114 is where the value for r is between first and second thresholds c1,c2; the second region 115 is where the value for r is between the second and a third threshold c2,c3; the third region 116 is where the value for r is between the third and a fourth threshold c3,c4; and the fourth region 117 is where the value for r is between the fourth and a fifth threshold c4,c5. In the example shown, c1 corresponds to a first endpoint of the locus 110; c2 corresponds to a first endpoint of the medial axis 111 of the locus 110; c3 corresponds to the junction between the two lines 112,113 of the medial axis 111 of the locus 110; c4 corresponds to the second endpoint of the medial axis 111 of the locus 110; and c5 to the second endpoint of the locus 110. In steps 201 to 204 described below, each pixel is located on one of these four regions 114-117 using its original rg chromaticity values.

Returning to FIG. 3, next, in step or block 201, the rg chromaticity values of each pixel are checked to determine whether the pixel is on the second region 115 of the locus 110.

In step or block 202, for each pixel that is determined not to be on the second region 115, its rg chromaticity values are checked to determine whether the pixel is on the third region 116 of the locus 110.

In step or block 203, for each pixel that is determined not to be on the second region 115 or the third region 116, its rg chromaticity values are checked to determine whether the pixel is on the first region 114 of the locus 110.

In step or block 204, for each pixel that is determined not to be on the second region 115, the third region 116 or the first region 114, its rg chromaticity values are checked to determine whether the pixel is on the fourth region 117 of the locus 110.

Those pixels that are not on any of the four regions 114-117 in the skin locus 110 are determined to be non-skin colour pixels and are fed directly to the rg chromaticity-to-RGB conversion step or block 106.

Below is the pseudo code for this example of the locus region identification:

```
if ((r>c1)&&(r<=c2))
    //region1
    else if((r>c2)&&(r<=c3))
        //region2
    else if((r>c3)&&(r<=c4))
        //region3
    else if((r>c4)&&(r<=c5))
        //region4
    else
        //non-skin
```

It may be noted that in this example, only the r coordinate of the pixel location on the rg chromaticity plane is used to determine the locus region 114-117.

The next step or block is the skin probability calculation 104 which is carried out for each skin colour pixel. A number of different ways of calculating a skin colour probability are possible. In one example, the skin colour probability of a pixel is calculated using a distance metric. In one example, two types of distance metric are used. The first distance metric is used for skin pixels that are in the first or fourth regions 114,117 and the second distance metric is used for skin pixels that are in the second or third regions 115,116.

Figure 5:
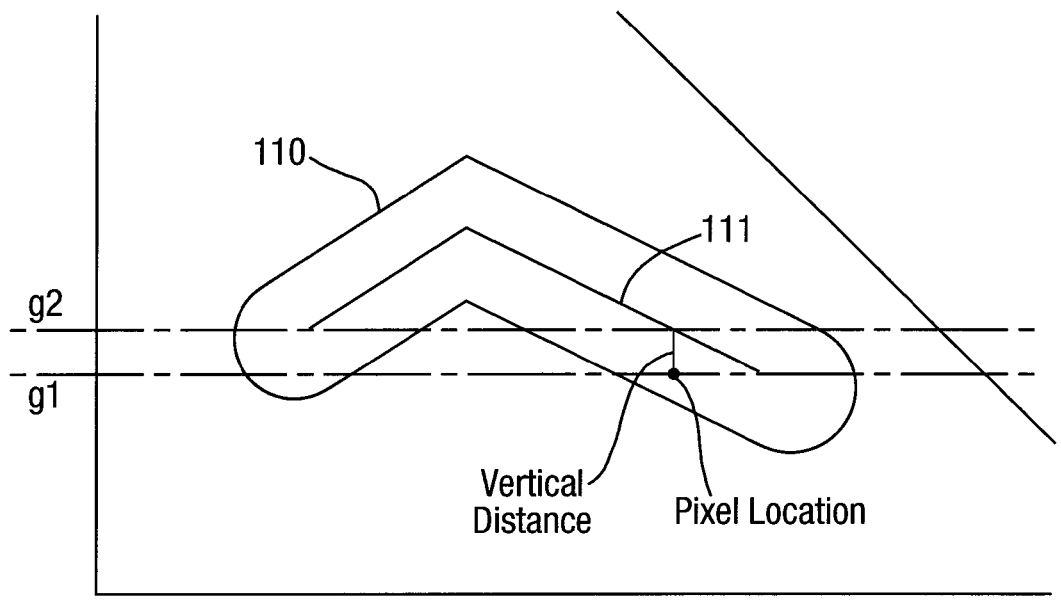
FIG. 5 shows an example of vertical distance calculation between pixel location and locus medial axis.

Thus, and referring also to FIG. 5, in one example, if the pixel is on the second or third regions 115,116, then the distance metric that is used is the vertical distance (i.e. the difference in the g coordinates or values) between the pixel location and the locus medial axis 111 is calculated as a distance metric in step or block 301:

$$vd = abs(g1-g2)$$

where vd denotes vertical distance.

Figure 6:
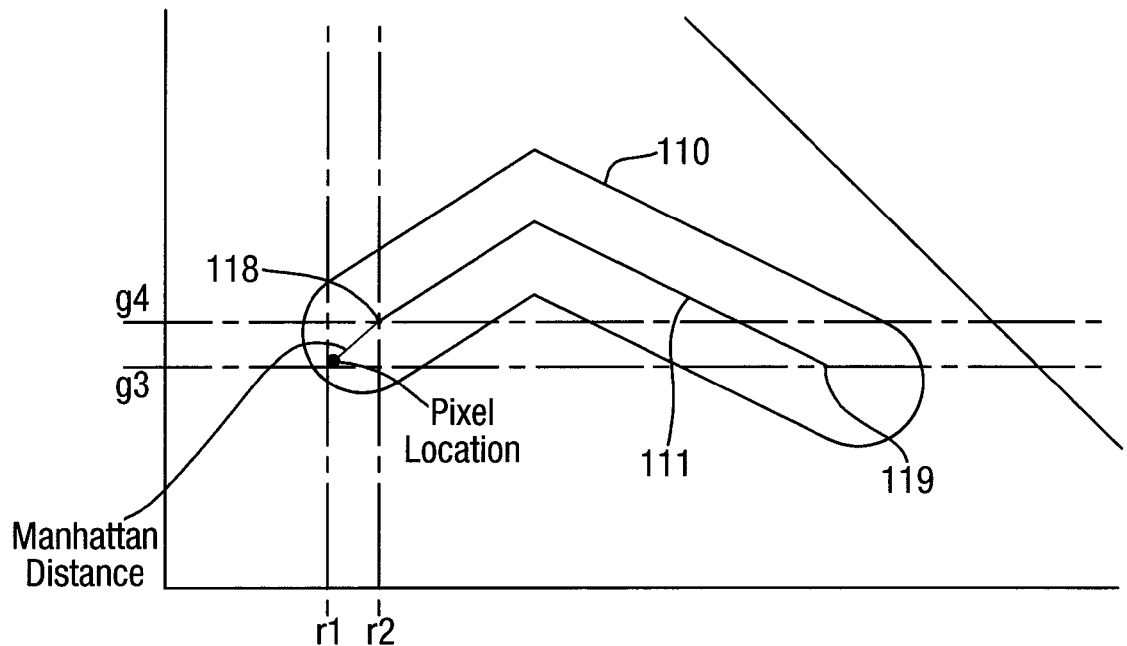
FIG. 6 shows an example of Manhattan distance calculation between pixel location and locus medial axis endpoint; and, FIG. 7 shows an example of a skin colour probability vs. distance function which may be used in the example of FIG. 2.

On the other hand, and referring also to FIG. 6, in one example, if the pixel is on the first or fourth regions 114,117, then the distance metric that is used is the "Manhattan distance" between the pixel location and the closest endpoint 118,119 of the medial axis 111 (i.e. the leftmost endpoint 118 of the medial axis 111 is used for skin colour pixels in the first region 114 and the rightmost endpoint 119 of the medial axis 111 is used for skin colour pixels in the fourth region 117). The concept of a Manhattan distance is known per se and in this case is calculated as a distance metric in step or block 302:

$$md = abs(r1-r2) + abs(g3-g4)$$

where md denotes the Manhattan distance.

The distance metric calculated for each pixel in the steps or blocks 301,302 is fed to the probability calculation step or block 104 and a corresponding skin colour probability of each pixel is calculated. A number of different ways of calculating a corresponding skin colour probability are possible, i.e. a number of different probability vs. distance functions are possible. In general, the skin probability should decrease with distance of the rg chromaticity values or coordinates of the pixel in the rg chromaticity plane from the medial axis 111. Also, in general, the probability vs. distance function should be a non-negative, monotonically decreasing function. An example is shown in FIG. 7 in which the skin probability initially decreases linearly and relatively slowly with distance up to a first distance threshold d1, then decreases linearly and relatively more quickly with distance up to a second distance threshold d2, and then decreases linearly and relatively slowly again with distance up to a third distance threshold d3 at which the skin probability is set to zero. It will be understood that this is a simple example, and therefore one that is not computationally complex, and that other, more complex functions may be used.

In step or block 105, the rg chromaticity values of the skin colour pixels are updated using the skin colour probability calculated in step or block 104. In one example, this update is simply the movement of pixel coordinates towards the medial axis 111 of the skin locus 110. The amount of movement of each pixel depends on the skin colour probability of the pixel. In one example, the movement is different in different regions of the locus 110. If the pixel is on the second or third regions 115,116, then the movement is just in the vertical direction (i.e. only the g value for the pixel is altered). If the pixel is on the first or fourth regions, then the pixel coordinates are moved both horizontally and vertically (i.e. the r and g values for the pixel are both altered) towards the respective endpoint 118,119 of the medial axis 111 of the skin locus 110 (i.e. the leftmost endpoint 118 for a pixel on the first region 114 and the rightmost endpoint 119 for a pixel on the fourth region 117).

The detailed behaviour of the process may be controllable by having various input parameters that can be adjusted, preferably as user-adjustable parameters.

For example, the amount of movement of the skin colour pixels on the chromaticity plane may be controlled with a parameter s that adjusts the "strength" of the algorithm. The strength parameter s can have range from 0 to 1. If s=0, then there is no movement of the skin colour pixels on the chromaticity plane, which means that there is no skin colour correction. If s=1, then full correction is applied. For values of s between 0 and 1, a corresponding proportional amount of correction is applied.

As another example, a separate parameter t to choose the skin tone preference region may be provided. This preference parameter t can take two values: −1 and 1. If t=1, then movement on the second and third regions 115,116 is towards the medial axis 111. If t=−1 and the pixel location is below the medial axis 111, then movement is away from the medial axis 111. If t=−1 and the pixel location is above the medial axis 111, then movement is towards the medial axis. It will be understood that a movement towards the medial axis 111 on the second and third regions 115,116 means that skin colours will become more pale whereas going away from the medial axis 111 on the second and third regions 115,116 means that skin colours will become more vibrant (i.e. closer to the pink and red hues).

The above can be summarised by the following equations for the preferred movement process.

Referring particularly to FIG. 6, in the first region 114 (with the same strategy being used for the fourth region 117):

$$r' = ((r2-r1) \times p \times s) + r1$$

$$g' = ((g4-g3) \times p \times s) + g3$$

where s denotes the strength parameter, p denotes the skin colour probability, r1 and g3 are the original chromaticity values for the pixel, r2 and g4 are the chromaticity values for the endpoint 118 of the medial axis 111, and r' and g' are the updated chromaticity values for the pixel.

Referring particularly to FIG. 5, in the second region 115 (with the same strategy being used for the third region 116):

```
if t=1
{
    if the pixel is above the medial axis 111:
            g' = ((g2-g1) × p × s) + g1
    else:
            g' = ((g2-g1) × p × s) + g1
}
else if t=-1
{
    if the pixel is above the medial axis 111:
            g' = ((g2-g1) × p × s) + g1
    else:
            g' = ((g1-g2) × p × s) + g1
}
``` where s denotes the strength parameter, t denotes the preference parameter, p denotes the skin colour probability, g1 is the original g chromaticity value of the pixel, and g2 is the g chromaticity value of the point on the medial axis 111 that has the same r chromaticity value as the pixel (i.e. the point on the medial axis 111 that is directly "above" or "below" the original location of the pixel on the rg chromaticity plane).

In step or block 106, the modified rg chromaticity values for the pixels are converted to corresponding RGB coordinates as shown below:

$$R' = r' \times (R+G+B)$$

$$G' = g' \times (R+G+B)$$

where r' and g' denote the updated chromaticity values on the rg chromaticity plane and R' and G' denote the updated red and green components on the RGB colour cube. Also, the rg chromaticity data for the non-skin colour pixels are received directly from the skin locus checking step or block 103 and converted to corresponding RGB coordinates. Alternatively, the original RGB coordinates for the non-skin pixels may have been stored previously and those original values recovered at this point.

In step or block 107, the modified RGB values for the skin colour pixels and the RGB values for the non-skin colour pixels are fed to an output buffer. From there, the image can be produced, whether by display on a television screen or other monitor, printed, etc.

Embodiments of the invention have been described with particular reference to the examples illustrated. However, it will be appreciated that variations and modifications may be made to the examples described within the scope of the invention.

The invention claimed is:

1. A method of detecting skin tone pixels in an input image and adjusting colour values thereof for an output image, the method comprising:
   determining, by software running on computer equipment or software embedded in an integrated circuit or dedicated hardware, for each of a plurality of pixels in an input image whether initial chromaticity values of each of said pixels lie within a skin tone area defined in a chromaticity plane; and,
   amending, by the software running on computer equipment or the software embedded in an integrated circuit or the dedicated hardware, the initial chromaticity values of those pixels that have chromaticity values lying within said skin tone area to obtain amended chromaticity values for use in obtaining an output image, wherein, for each of those pixels that have initial chromaticity values lying within said skin tone area, the chromaticity values are amended by an amount that depends on a distance of said initial chromaticity values for said pixel from a point within the skin tone area.

2. A method according to claim 1, wherein, for each of said pixels, said distance is a distance from the initial chromaticity values of said pixel to the medial axis of the skin tone area.

3. A method according to claim 2, wherein the skin tone area is divided into plural regions and a first distance metric is used for pixels in a first of said regions and a second, different distance metric is used for pixels in a second of said regions.

4. A method according to claim 3, wherein the first of said regions is in a central region of the skin tone area and the first distance metric is the distance from the initial chromaticity values of said pixel to the medial axis of the skin tone area in a direction parallel to an axis of the chromaticity plane.

5. A method according to claim 3, wherein the second of said regions is at or towards an end of the skin tone area and the second distance metric is the Manhattan distance from the initial chromaticity values of said pixel to the endpoint of the medial axis of the skin tone area that is closest to the initial chromaticity values of said pixel.

6. A method according to claim 1, wherein the colours of the pixels in the input image are initially provided as values according to the RGB colour model, the method comprising:
   prior to the determining step, converting the RGB colour values of the pixels to corresponding initial chromaticity values which are used in the determining and amending steps; and,
   after the amending step, converting the amended chromaticity values to corresponding values according to the RGB colour model for use in obtaining the output image.

7. A method according to claim 1, wherein the chromaticity values of those pixels that have chromaticity values lying outside said skin tone area are not amended.

8. A method of detecting skin tone pixels in an input image and adjusting colour values thereof for an output image, the method comprising:
   determining, by software running on computer equipment or software embedded in an integrated circuit or dedicated hardware, for each of a plurality of pixels in an input image whether initial chromaticity values of each of said pixels lie within a skin tone area defined in a chromaticity plane; and,
   amending, by the software running on computer equipment or the software embedded in an integrated circuit or the dedicated hardware, the initial chromaticity values of those pixels that have chromaticity values lying within said skin tone area to obtain amended chromaticity values for use in obtaining an output imaged, wherein the skin tone area is divided into plural regions, and wherein amending the initial chromaticity values of those pixels that have chromaticity values lying within said skin tone area to obtain amended chromaticity values for use in obtaining an output image comprises:
   amending, by the software running on computer equipment or the software embedded in an integrated circuit or the dedicated hardware, the initial chromaticity values of those pixels that have chromaticity values lying within a first of said regions of said skin tone area to obtain amended chromaticity values in accordance with a first function; and,
   amending, by the software running on computer equipment or the software embedded in an integrated circuit or the dedicated hardware, the initial chromaticity values of those pixels that have chromaticity values lying within a second of said regions of said skin tone area to obtain amended chromaticity values in accordance with a second function, which is different from the first function.

9. A method according to claim 8, wherein the first of said regions is in a central region of the skin tone area and said first function moves the chromaticity values of those pixels that are in the first of said regions towards an endpoint of the medial axis of the skin tone area.

10. A method according to claim 8, wherein the second of said regions is at or towards an end of the skin tone area and said second function moves the chromaticity values of those pixels that are in the second of said regions in a direction parallel to an axis of the chromaticity plane.

11. A method according to claim 8, wherein the colours of the pixels in the input image are initially provided as values according to the RGB colour model, the method comprising:
   prior to the determining step, converting the RGB colour values of the pixels to corresponding initial chromaticity values which are used in the determining and amending steps; and,
   after the amending step, converting the amended chromaticity values to corresponding values according to the RGB colour model for use in obtaining the output image.

12. A method according to claim 8, wherein the chromaticity values of those pixels that have chromaticity values lying outside said skin tone area are not amended.

13. Apparatus for detecting skin tone pixels in an input image and adjusting colour values thereof for an output image, the apparatus comprising:
   a pixel classifier for determining for each of a plurality of pixels in an input image whether initial chromaticity values of each of said pixels lie within a skin tone area defined in a chromaticity plane; and,
   a colour value adjuster for amending the initial chromaticity values of those pixels that have chromaticity values lying within said skin tone area to obtain amended chromaticity values for use in obtaining an output, wherein the colour value adjuster is constructed and arranged so that, for each of those pixels that have initial chromaticity values lying within said skin tone area, the chromaticity values are amended by an amount that depends on a distance of said initial chromaticity values for said pixel from a point within the skin tone area.

14. Apparatus according to claim 13, wherein the colour value adjuster is constructed and arranged so that, for each of said pixels, said distance is a distance from the initial chromaticity values of said pixel to the medial axis of the skin tone area.

15. Apparatus according to claim 14, wherein the skin tone area is divided into plural regions and the apparatus is constructed and arranged so that a first distance metric is used for pixels in a first of said regions and a second, different distance metric is used for pixels in a second of said regions.

16. Apparatus according to claim 15, wherein the first of said regions is in a central region of the skin tone area and the first distance metric is the distance from the initial chromaticity values of said pixel to the medial axis of the skin tone area in a direction parallel to an axis of the chromaticity plane.

17. Apparatus according to claim 15, wherein the second of said regions is at or towards an end of the skin tone area and the second distance metric is the Manhattan distance from the initial chromaticity values of said pixel to the endpoint of the medial axis of the skin tone area that is closest to the initial chromaticity values of said pixel.

18. Apparatus according to claim 13, wherein the colours of the pixels in the input image are initially provided as values according to the RGB colour model, the apparatus comprising:
  a colour value converter for converting the RGB colour values of the pixels to corresponding initial chromaticity values for use in the pixel classifier and the colour value adjuster; and,
  a colour value re-converter for converting the amended chromaticity values to corresponding values according to the RGB colour model for use in obtaining the output image.

19. Apparatus according to claim 13, wherein the apparatus is constructed and arranged so that the chromaticity values of those pixels that have chromaticity values lying outside said skin tone area are not amended.

20. Apparatus for detecting skin tone pixels in an input image and adjusting colour values thereof for an output image, the apparatus comprising:
  a pixel classifier for determining for each of a plurality of pixels in an input image whether initial chromaticity values of each of said pixels lie within a skin tone area defined in a chromaticity plane; and,
  a colour value adjuster for amending the initial chromaticity values of those pixels that have chromaticity values lying within said skin tone area to obtain amended chromaticity values for use in obtaining an output image, wherein the skin tone area is divided into plural regions, and the colour value adjuster is constructed and arranged so that:
    the initial chromaticity values of those pixels that have chromaticity values lying within a first of said regions of said skin tone area are amended to obtain amended chromaticity values in accordance with a first function; and,
    the initial chromaticity values of those pixels that have chromaticity values lying within a second of said regions of said skin tone area are amended to obtain amended chromaticity values in accordance with a second function, which is different from the first function.

21. Apparatus according to claim 20, wherein the first of said regions is in a central region of the skin tone area and said first function operates to move the chromaticity values of those pixels that are in the first of said regions towards an endpoint of the medial axis of the skin tone area.

22. Apparatus according to claim 20, wherein the second of said regions is at or towards an end of the skin tone area and said second function operates to move the chromaticity values of those pixels that are in the second of said regions in a direction parallel to an axis of the chromaticity plane.

23. Apparatus according to claim 20, wherein the colours of the pixels in the input image are initially provided as values according to the RGB colour model, the apparatus comprising:
  a colour value converter for converting the RGB colour values of the pixels to corresponding initial chromaticity values for use in the pixel classifier and the colour value adjuster; and,
  a colour value re-converter for converting the amended chromaticity values to corresponding values, according to the RGB colour model for use in obtaining the output image.

24. Apparatus according to claim 20, wherein the apparatus is constructed and arranged so that the chromaticity values of those pixels that have chromaticity values lying outside said skin tone area are not amended.

* * * * *